United States Patent
Lei et al.

(10) Patent No.: US 10,435,801 B2
(45) Date of Patent: Oct. 8, 2019

(54) CARBON GASIFICATION ASSISTED SOLID OXIDE ELECTROLYSIS CELL

(71) Applicant: UNIVERSITY OF SOUTH CAROLINA, Columbia, SC (US)

(72) Inventors: Libin Lei, Columbia, SC (US); Fanglin Chen, Irmo, SC (US); Yao Wang, Columbia, SC (US)

(73) Assignee: University of South Carolina, Columbia, SC (US)

( * ) Notice: Subject to any disclaimer, the term of this patent is extended or adjusted under 35 U.S.C. 154(b) by 240 days.

(21) Appl. No.: 15/460,373

(22) Filed: Mar. 16, 2017

(65) Prior Publication Data
US 2017/0292197 A1   Oct. 12, 2017

Related U.S. Application Data

(60) Provisional application No. 62/318,922, filed on Apr. 6, 2016.

(51) Int. Cl.
| | |
|---|---|
| *C25B 9/08* | (2006.01) |
| *C25B 1/02* | (2006.01) |
| *C25B 13/04* | (2006.01) |
| *C25B 11/04* | (2006.01) |
| *C25B 9/18* | (2006.01) |

(52) U.S. Cl.
CPC ............. *C25B 9/08* (2013.01); *C25B 1/02* (2013.01); *C25B 9/18* (2013.01); *C25B 11/0426* (2013.01); *C25B 13/04* (2013.01); *Y02P 20/129* (2015.11); *Y02P 20/133* (2015.11)

(58) Field of Classification Search
CPC ................ C25B 9/08; C25B 9/18; C25B 1/02
See application file for complete search history.

(56) References Cited

U.S. PATENT DOCUMENTS

| | | | |
|---|---|---|---|
| 9,574,274 B2 | 2/2017 | Chen | |
| 2009/0235587 A1* | 9/2009 | Hawkes | C10J 3/00 48/202 |
| 2014/0272734 A1* | 9/2014 | Braun | C10K 1/04 431/11 |
| 2015/0299871 A1* | 10/2015 | Chen | C25B 1/02 205/555 |

* cited by examiner

Primary Examiner — Arun S Phasge
(74) Attorney, Agent, or Firm — Dority & Manning, P.A.

(57) ABSTRACT

A syngas generation system that combines a solid oxide electrolysis cell (SOEC) and a carbon gasification unit is described. On the cathode side of the SOEC, $CO_2$ and $H_2O$ are electrochemically converted to syngas. At the anode side of the system, a second stream of syngas is produced through a carbon gasification process in which solid carbon is reacted with $H_2O/CO_2$. Oxygen ion transported across the SOEC electrolyte reacts at the anode with a portion of the syngas produced in the gasification process. This reaction product ($H_2O/CO_2$) can be fed back to the gasification unit.

18 Claims, 2 Drawing Sheets

CARBON GASIFICATION ASSISTED SOLID OXIDE ELECTROLYSIS CELL

CROSS REFERENCE TO RELATED APPLICATION

This application claims filing benefit of U.S. Provisional Patent Application Ser. No. 62/318,922 having a filing date of Apr. 6, 2016, which is incorporated herein by reference for all purposes.

BACKGROUND

Fossil fuels, such as coal, oil, and natural gas are non-renewable energy sources and their ever-increasing consumption leads to excessive emission of greenhouse gases, and in particular carbon dioxide ($CO_2$). To mitigate negative consequences of fossil fuel use, methods for reduction of carbon emission have been implemented, but with marginal success. Concern over fossil fuel use has also led to global development and implementation of renewable energy sources over the past decades. Renewable energy sources such as wind and solar are increasingly harvested to generate electricity, but the intermittent nature of these sources requires the capacity for large-scale energy storage.

Co-electrolysis of steam and carbon dioxide by use of solid oxide electrolysis cells (SOEC) is a promising energy storage method that can efficiently transform electrical energy into syngas (a mixture of $H_2$ and CO), which can be stored and converted back to electricity at a later time or can be used as feedstock for chemical synthesis. Unfortunately, there are still major challenges for large scale deployment of SOECs. One principal challenge is that a significant portion of energy input is required to overcome the large oxygen potential gradient (e.g., open circuit voltage up to 1.0 V) in the electrolysis process because the anode is often exposed to air, which has a high oxygen partial pressure. Reducing the oxygen partial pressure at the anode and the resulting lowering of the open circuit voltage (OCV) is desirable. Utilizing oxygen produced at the anode would also be beneficial in further improving system efficiency.

Carbon gasification (CG) is a known process used to transform carbon-containing solids (such as coal and biomass) into gaseous fuels such as CO, $H_2$, and $CH_4$. It has emerged as a clean and effective way for the production of gaseous fuels that can be used for power generation or synthesis of chemicals.

What are needed in the art are efficient energy storage technologies to improve use of renewable energy sources and decrease carbon emissions.

SUMMARY

According to one embodiment, disclosed is a system that includes a solid oxide electrolysis cell (SOEC) in conjunction with a carbon gasification unit. For instance, a system can include an SOEC that includes first and second electrodes (i.e., a cathode and an anode) and an oxygen ion-conducting electrolyte separating the two electrodes. A system can also include a carbon gasification unit in fluid communication with the second electrode (the anode) of the SOEC. For instance, the carbon gasification unit can include a carbon gasification bed that is in fluid communication with the anode. During use, syngas generated at the gasification unit can react with oxygen ion at the anode. Thus, in the system, the partial pressure of oxygen at the anode can be reduced and additional syngas product can be formed at the anode.

Also disclosed are methods for generating syngas by use of the disclosed systems. In general, a method can include electrochemically reducing water (e.g., steam) and carbon dioxide at a first electrode to produce a syngas product and oxygen ion. The oxygen ion can then migrate across the electrolyte to the second electrode. A method can also include carrying out a gasification reaction during which water (steam), carbon dioxide and carbon react to form additional syngas. A portion of this syngas can contact the second electrode upon which the hydrogen and carbon monoxide of the syngas can react with the oxygen ion to product carbon dioxide and water. This carbon dioxide and water can be utilized as reactants in the gasification reaction.

BRIEF DESCRIPTION OF THE DRAWINGS

A full and enabling disclosure of the present invention, including the best mode thereof, directed to one of ordinary skill in the art, is set forth in the specification, which makes reference to the appended figure, in which.

DETAILED DESCRIPTION

The following description and other modifications and variations to present invention may be practiced by those of ordinary skill in the art, without departing from the spirit and scope of the present invention. In addition, it should be understood that aspects of the various embodiments may be interchanged both in whole and in part. Furthermore, those of ordinary skill in the art will appreciate that the following description is by way of example only, and is not intended to limit the invention.

The present disclosure is generally directed to a syngas generation system that combines a solid oxide electrolysis cell (SOEC) and a carbon gasification unit. The SOEC includes three primary components including two electrodes (i.e., an anode and a cathode) and an electrolyte. On the cathode side of the system, $CO_2$ and $H_2O$ fed to the cell are electrochemically converted to syngas, similar to co-electrolysis conversion processes as are known in conventional systems. In contrast to conventional co-electrolysis SOEC however, at the anode side of the system, a second stream of syngas is produced through a carbon gasification process in which solid carbon is reacted with $H_2O/CO_2$. At least a portion of the $H_2O$ and $CO_2$ fed to the gasification unit can be produced at the anode. For instance, oxygen ion transported across the electrolyte can react at the anode with a portion of the syngas produced in the gasification process. This reaction product ($H_2O/CO_2$) can be fed back to the gasification unit.

The introduction of the carbon gasification unit at the anode side of the cell can significantly lower the partial pressure of oxygen at the electrode as compared to air electrodes used in traditional SOEC co-electrolysis systems. This can reduce the electrical potential barrier of the electrolysis and as such significantly less electricity can be consumed in overcoming the potential barrier between the two electrodes; thereby increasing total energy efficiency of the system. In addition, the system can produce syngas product at both electrodes of the SOEC. As such, disclosed systems can, among other benefits, provide a potential pathway for efficient and eco-friendly utilization of carbon (e.g., coal, biomass, etc.) and $CO_2$ to produce clean fuel and store energy, and in one embodiment can provide a carbon neutral sustainable energy supply. Moreover, syngas produced by a system can be subsequently used as feedstock through the well-established Fischer-Tropsch (F-T) process to produce liquid synthetic fuel that can more easily be stored and transported using the existing infrastructure as compared with the hydrogen alternative. Moreover, this method does not require pure $CO_2$, which is more flexible for practical adoption.

Figure 1:
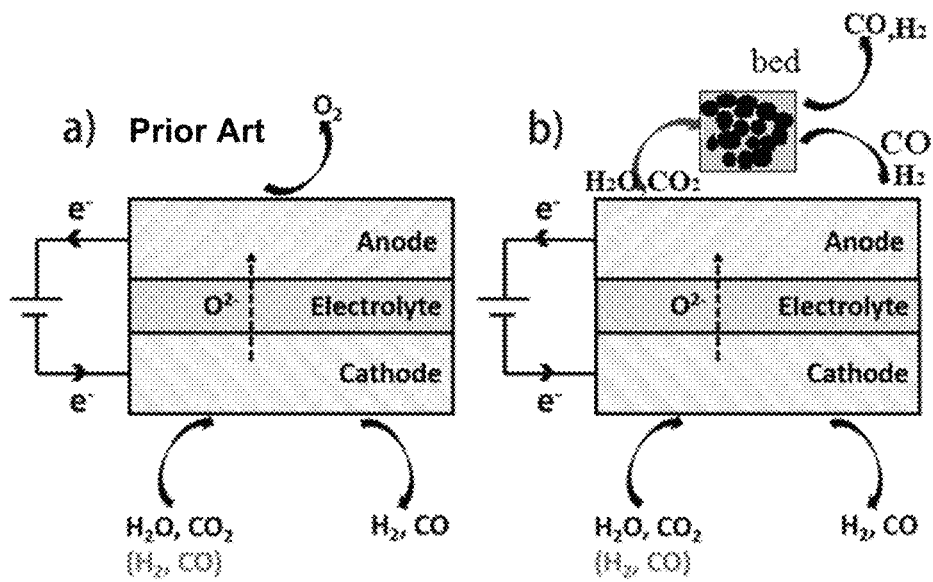
FIG. 1 schematically illustrates a conventional solid oxide co-electrolysis process at a) and a carbon gasification assisted solid oxide co-electrolysis process at b).

FIG. 1 presents a simplified diagram of a conventional solid oxide co-electrolysis cell for syngas production at a). In the conventional system, a feed stream that includes water, generally in the form of steam ($H_2O$) and carbon dioxide ($CO_2$) is introduced to the cathode side of the SOEC, where steam ($H_2O$) and carbon dioxide ($CO_2$) receive electrons from an external power source to produce hydrogen gas ($H_2$), carbon monoxide (CO) and oxygen ions ($O^{2-}$), described in reactions (1) and (2) below. A reverse water gas shift reaction can also take place at the cathode side, as described in reaction (3) in which carbon dioxide introduced to the cathode can react with hydrogen produced in reaction (1).

$$H_2O + 2e^- \rightarrow H_2 + O^{2-} \quad (1)$$

$$CO_2 + 2e^- \rightarrow CO + O^{2-} \quad (2)$$

$$CO_2 + H_2 \rightarrow CO + H_2O \quad (3)$$

The oxygen ions ($O^{2-}$) can then be transported through the electrolyte to the anode side by the effect of concentration diffusion and/or by assistance of an external applied electrical field.

On the anode side, the oxygen ions can be oxidized to form oxygen, illustrated as reaction (4):

$$2O^{2-} \rightarrow O_2 + 4e^- \quad (4)$$

Thus the total reaction of conventional solid oxide co-electrolysis process is shown as reaction (5):

$$H_2O(g) + CO_2(g) \rightarrow H_2(g) + CO(g) + O_2(g) \quad (5)$$

FIG. 1 at b) illustrates a system as described herein that includes a carbon gasification unit in communication with the anode of the SOEC. The cathode side of the SOEC can be similar to that of a traditional SOEC as described above. For example, water and carbon dioxide may be introduced on the cathode side of the SOEC cell by a feed stream.

Carbon dioxide can be obtained from any suitable source. For example, carbon dioxide stored in a gas or liquid state may be included as a component of a feed stream to an SOEC. Carbon dioxide produced as an off-gas or waste gas in a manufacturing process can be used as a source of carbon dioxide. In some embodiments, carbon dioxide from the combustion of coal, gas, oil, wastes, or other materials, from petrochemical refining processes, or from biological reduction processes may provide a source for the $CO_2$ feed. In one embodiment, a power plant, e.g., a coal-fired, gas-fired or any other type of power plant including, without limitation, oil-fired, biofuel, or nuclear power plant may serve as a source of a carbon dioxide feed to the syngas generation system.

A carbon dioxide source may also provide energy for use in the syngas production process, e.g., electrical energy or heat. For example, waste heat produced at a power plant may be used to heat the carbon dioxide stream(s) and/or to form steam of a feed stream. Similarly, electricity produced by a power plant may be used in a syngas production process to provide the necessary voltage potential to an SOEC. Electricity produced by a power plant may also be used to generate steam or other necessary components for a syngas production process.

The feed to the cathode side of the SOEC can be controlled so as to produce a syngas product with a desired ratio of product components. For instance, the ratio of the $CO_2$ to $H_2O$ in the feed to the cathode can be controlled to control the $H_2$:CO ratio of the product syngas. In one embodiment, the $CO_2$:$H_2O$ ratio can be controlled to prove the syngas product off of the cathode with a $H_2$:CO ratio of from about 1:1 to about 3:1, or about 2:1 in some embodiments.

The electrolysis reactions carried out at the cathode side of the SOEC can generally be carried out at temperatures from about 500° C. to about 1200° C., or from about 800° C. to about 1000° C. in some embodiments. As such the syngas formed at the cathode side of the SOEC can be at or above about 500° C. in some embodiments.

It can be beneficial in some embodiments to provide the $H_2O$ and $CO_2$ to the SOEC at an increased temperature, such as about 500° C. or higher, for instance at temperatures from about 500° C. (773 K) to about 1000° C. (1273 K) in some embodiments. Feed and/or product streams may be heated using conventional techniques. For example, a feed stream can be fed to the SOEC by a suitable pipe that can be wrapped with electrical heat tape wrapped, that can be exposed to steam such as by use of a conventional heat exchanger, or by any other system.

The cathode of the SOEC may include cathode materials conventionally used with SOECs. In general, the cathode may be formed of porous materials so as to improve contact between the cathode material and the reactants, as is known. For example, a cathode can include a nickel-zirconia cermet material including ceramics such as, and without limitation, yttria stabilized zirconia (YSZ), samaria doped ceria (SDC) gadolinium doped ceria (GDC) as well as combinations thereof as are known in the art. Cathode materials can include, by way of example and without limitation, Ni—YSZ, Ni—ScSZ, Ni—$ZrO_2$, Ni-SDC/GDC, etc. Other cathode materials such as electronic perovskites may be utilized including, without limitation, $LaMO_x$ type (e.g. $La_2NiO_4$), where M is typically a transition metal, are also encompassed. However, it should be understood that the materials used to form a cathode may include any material as is known in the art for use in an SOEC cathode.

The structure of the cathode is not particularly limited. For instance, the cathode can be formed from desired materials in powder form. The powders can generally be compacted by various known techniques such as pressing, extrusion, slip casting, and others, and can then be sintered into porous shapes, according to standard practice.

The carbon dioxide and hydrogen product stream at the cathode can be collected together as a single syngas product stream. Any water by-product of the co-electrolysis reaction can be decomposed as discussed above according to a revers water gas shift reaction. Some or all of the water can be removed in the syngas product stream according to any suitable methodology.

The electrolyte may be formed of oxygen-ion conducting electrolyte material as is known in the art. For example, the oxygen-ion conducting electrolyte may include, but is not limited to, yttria stabilized zirconia (YSZ), scandia stabilized zirconia (SSZ), lanthanum gallate materials (LSGM) (e.g., $(La_{0.6}Sr_{0.4})(Ga_{0.8}Mg_{0.2})O_3$), ytterbium stabilized zirconia, doped ceria ($CeO_2$), as well as combinations of electrolyte materials.

Referring again to FIG. 1 at b), the disclosed systems incorporate a carbon gasification unit in contact with the anode of the SOEC, as shown. The anode reactions will thus include reaction of the oxygen ion transported across the SOEC electrolyte with CO and $H_2$ formed in the carbon gasification process. As such, the anode can include a material that can withstand the carbon monoxide reactant at the reaction temperatures. Suitable anode materials can include, by way of example and without limitation, a solid electrolyte phase such as $Sr_2Fe_{1.5}Mo_{0.5}O_{6-\delta}$ (SFM), $La_{0.7}Ca_{0.3}Cr_{0.97}O_3$ (LCC), and the like.

The carbon gasification system can include a gasification chamber (e.g., a fluid carbon bed) that is in communication with the anode of the SOEC, as shown. A carbon gasification reaction can be carried out in the gasification chamber through the Boudouard reaction (6) and the steam-carbon reaction (7). In this process, carbon reacts with $H_2O$ and $CO_2$ to produce CO and $H_2$. In the presently disclosed system, at least a portion of the CO and the $H_2$ product from the gasification chamber can pass to the anode (via, e.g., diffusion) for reaction with $O^{2-}$ to form $CO_2$ and $H_2O$, as described in reaction (8) and (9) and illustrated in FIG. 1 at b). These products can then be cycled back to the gasification unit, as shown. Consequently, a sustainable cycle between solid carbon and the reaction sites of the anode can be realized due to the combination of the carbon gasification system and the SOEC via reactions (6)-(9).

$$CO_2 + C \rightarrow 2CO \quad (6)$$

$$C + H_2O \rightarrow CO + H_2 \quad (7)$$

$$CO + O^{2-} \rightarrow CO_2 \quad (8)$$

$$H_2 + O^{2-} \rightarrow H_2O \quad (9)$$

A total reaction scheme of the combined co-electrolysis process as disclosed herein is shown as reaction (10):

$$H_2O(g) + 2C + CO_2(g) \rightarrow H_2(g) + 3CO(g) \quad (10)$$

The carbon gasification unit can include a typical gasification system in which a solid carbon source is provided to a gasification chamber (e.g., a fluid bed) in conjunction with carbon dioxide and water as gasification agents. The carbon can be provided from any suitable non-renewable or renewable carbon source such as, and without limitation, peat, coke, char, petroleum coke, tar sand, coal, oil sand, waste plastics, biomass and carbon produced by pyrolysis of carbonaceous substance (charcoal).

The carbon particles can react with the steam and carbon dioxide upon contact in the gasifier, which is generally held at an elevated temperature in the range of about 760° C. to about 980° C. Reaction pressure of up to about 350 psia (e.g., about 2400 kPa) may be maintained in the gasifier, but this is not a requirement and in other embodiments, the gasifier can be maintained at atmospheric pressure. For instance, in one embodiment, the gasification chamber can be maintained at substantially atmospheric pressure throughout the reaction process. By 'substantially atmospheric pressure' is meant a pressure equivalent to, or not significantly greater than, atmospheric pressure, e.g., a pressure between 3 kPa(g) and 25 kPa(g), typically about 15 kPa(g).

Reaction of the carbon with the carbon dioxide and steam in the absence of oxygen can ensure a less than stoichiometric amount of oxygen, which can increase yield of carbon monoxide and hydrogen gaseous products. In general, however, the carbon monoxide and hydrogen products can be produced in conjunction with an amount of other hydrocarbons and char particles. The syngas product from the gasifier can be separated from any solids (char) by use of standard separator/classifier equipment. The solid particles that are completely reacted will be more dense and can be separated and utilized as desired, e.g., as feed to a boiler, while the solid particles that are partially reacted will be lighter and can be cycled back to the gasifier. The clean syngas can be pulled off of the bed with at least a portion being returned to the anode for reaction with the oxygen ions that have been transported across the electrolyte.

The gasification unit can be of any type and shape as is known in the art. In general, the gasification chamber can be a fluidized bed of elongate form and e.g., round, square or rectangular in cross-section. A plurality of burners, located in the sides of the gasification vessel towards its lower end, and each having its own carbon feed line, may be provided.

Electricity can be provided to the SOEC by any suitable power source. For example, a power source may include any direct current power source such as may be provided from a commercial power grid; a generator powered by gas, electricity, wind, water, steam, nuclear energy, solar energy, or other energy source; a battery or battery array; or any other conventional power source capable of supplying an electrical current to the SOEC.

Figure 2:
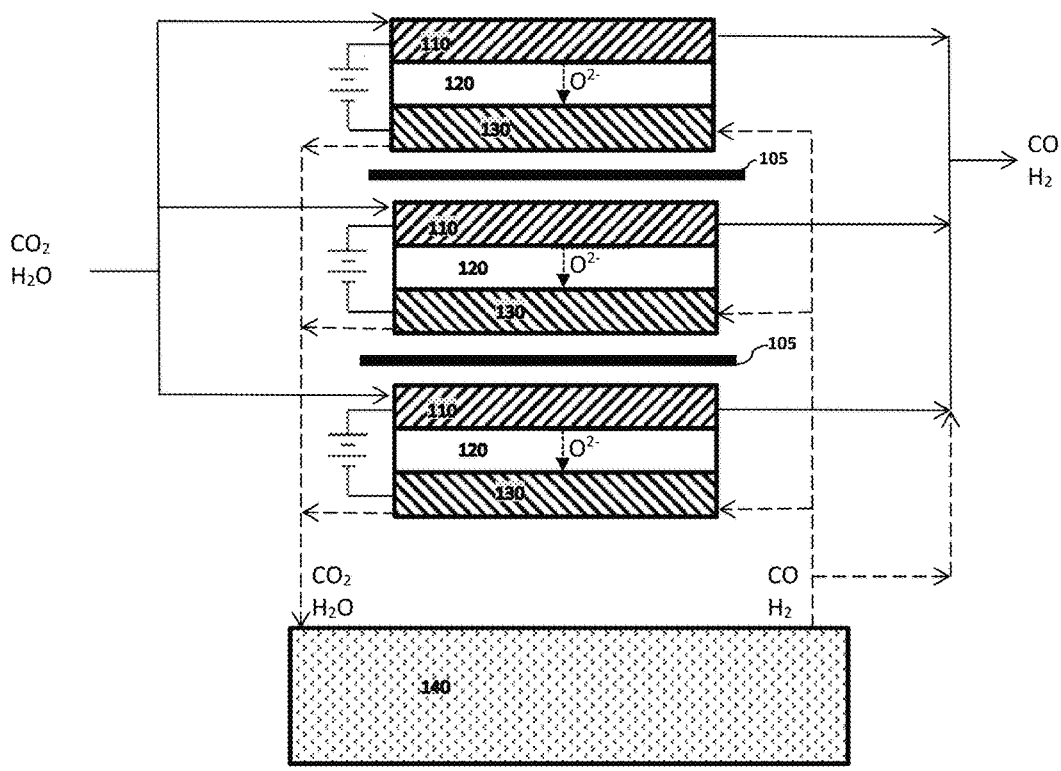
FIG. 2 schematically illustrates an array of SOECs in a system as disclosed herein.

A syngas generation system can include one or more SOECs, each of which can be in communication with the same or different carbon gasification units. For example, in one embodiment multiple SOECs can be combined to form one or more arrays of SOECs. FIG. 2 illustrates an array that includes a plurality of individual SOECs, each of which including a cathode 110, an anode 130, an electrolyte 120 sandwiched or otherwise positioned between the cathode 110 and anode 130, and a power source. In addition, the anode of each SOEC is in communication with a carbon gasification unit 140. During use, a $CO_2/H_2O$ feed can be delivered to each cathode 110, and the cathode reactions can form a syngas product including $H_2$ and CO that can be pulled off of the array. The oxygen ion can be transported across the electrolyte 120, either by diffusion alone or optionally in conjunction with an applied electrical gradient. The carbon gasification unit 140 can deliver syngas to each of the anodes 130, the components of which can react with the oxygen ion to form $CO_2$ and $H_2O$ that can be fed back to the carbon gasification unit 140. In addition, a portion of the syngas generated at the carbon gasification unit can exit the system as product stream, as shown.

A system may include interconnections 105 that can separate each of the SOECs from one another. The interconnections 105 may also serve to encase, or otherwise hold, the SOECs in a desired array configuration (not shown). While the array of SOECs illustrated in FIG. 2 includes only three SOECs, it is understood that an array can include as many or as few SOECs as desired. Furthermore, the SOECs used to form an array can be configured in different shapes, sizes, or positions within the array. For example, an array of SOECs may include one or more cells arranged in a planar fashion, such as being stacked in a horizontal or vertical plate configuration. Alternatively, the array may be configured in a tubular or circular fashion. Other array configurations may also be utilized according to embodiments of the invention and, as noted above, multiple arrays may be associated. Moreover, the cells of an individual array may be in communication with a single carbon gasification unit or with a plurality of units. In addition, a single carbon gasification unit may provide CO/$H_2$ containing gas to a single array of SOECs or a plurality of arrays, as desired.

A single feed stream may feed $H_2O$ and $CO_2$ to each of the SOECs in an array as illustrated in FIG. 2. In other embodiments, multiple feed streams (not shown) may feed $H_2O$ and/or $CO_2$ to any combination of the SOECs of an array. For instance, $H_2O$ can be fed to some, or all, of the SOECs in an array in conjunction with $CO_2$ in a single feed stream or in a separate feed stream, as desired. Various combinations of feed streams may be employed with embodiments of the invention to customize the component feeds to an array of SOECs or to individual SOECs.

Figure 3:
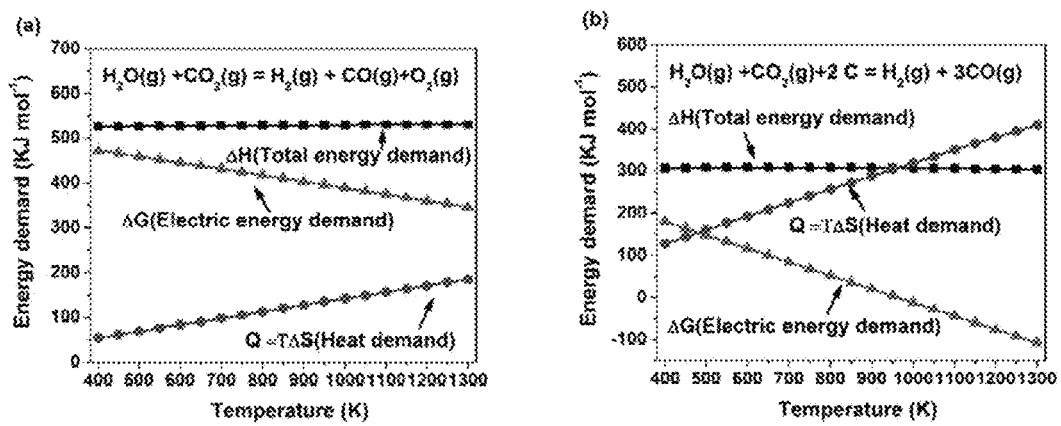
FIG. 3 graphically presents the thermodynamic calculation as a function of temperature for co-electrolysis processes include a conventional mode at a) and a carbon gasification assisted mode at b).

Through combination of a carbon gasification unit with an SOEC, the syngas production process can exhibit improved thermodynamics as compared to a traditional co-electrolysis process. A comparison of thermodynamic calculations in different mode is shown in FIG. 3. As shown, the thermodynamic results are quite different in different modes. When operated in the conventional mode as described in reaction (5), above, a process requires a total amount of energy ($\Delta H$) of about 528 kJ $mol^{-1}$ in a temperature range of from 400 to 1300 K. Although the electric energy demand shown in FIG. 3 at (a) accordingly decreases at high temperature with the significantly increase of heat due to the positive entropy ($\Delta S$), even at 1300 K, the $\Delta G$ still maintains at a high positive value above 300 k$Jmol^{-1}$. Since electricity is much more valuable than joule heat that may be readily available in the typical industrial process or from solar heating, this inevitable electric input degrades the competitiveness of the conventional solid oxide co-electrolysis technique.

As shown in FIG. 3, the combined system that includes a co-electrolysis process in conjunction with a carbon gasification unit with an overall reaction process as described in reaction (10), the total energy decreases 41% from the previous 528 to 310 k$Jmol^{-1}$. Moreover, it is noticeable that the electric energy demand $\Delta G$ reduces dramatically with temperature with the combined system. After the temperature reaches 1000 K, the $\Delta G$ becomes a negative value, suggesting that the co-electrolysis system can be self-sustaining without any electric input from an external power source.

Figure 4:
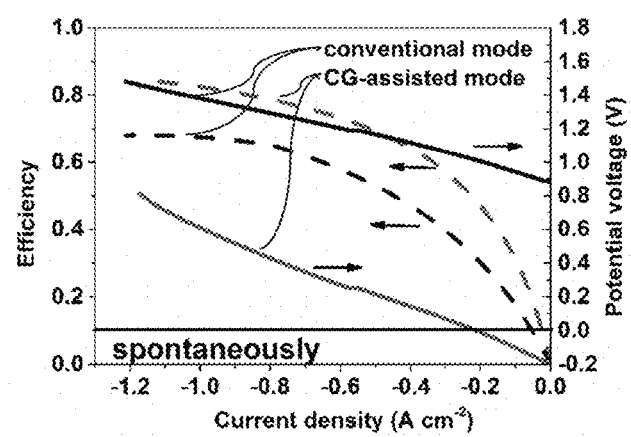
FIG. 4 presents the IV- and I-efficiency curves for a solid oxide electrolysis cell operated in conventional mode and in carbon gasification assisted mode.

FIG. 4 compares the I-V and I-efficiency curves for traditional SOECs and combined systems as disclosed herein. As can be seen, at 1123 K, the OCV of the disclosed system is –0.202 V, indicating that electrolysis in this mode is spontaneous (i.e., it is generating electricity), while the voltage needed for the electrolysis process of the conventional mode is 0.877 V. Even though the disclosed systems can operate in a spontaneous, self-sustaining fashion, in order to enhance the electrode kinetics and have relatively high electrolysis current density in practical applications, an external electricity input may be encompassed in disclosed systems, even at an operating temperature higher than 1123K. However, it can be seen that the I-V curve measured for operation of the disclosed systems stays below the curve measured for the conventional mode, indicating that a much lower potential is required to produce the same electrolysis current density. For example, the potential to produce electrolysis current density of 0.4 A $cm^{-2}$ is 0.9 V for the conventional mode; while the potential drops dramatically by nearly one order of magnitude to 0.14V when the cell is operated under the disclosed combined mode. Lower OCV means lesser potential barrier to split $H_2O$ or $CO_2$ in the disclosed systems.

The energy efficiency is defined as the ratio between energy output and energy input, as shown in equation (11):

$$\eta = \frac{N_{product}LHV_{product}}{W_{ele} + Q_{heat} + Q_{reactant} + N_{reactant}LHV_{reactant}} \quad (11)$$

in which $W_{ele}$ is the electricity input, $Q_{heat}$ represents the heat needed to maintain operation of the system, $Q_{reactant}$ represents the heat needed to heat the reactants from room temperature to operation temperature of the system, $N_{product}$ is mole rate of product (CO and $H_2$), $LHV_{product}$ is the lower heating value of the product, $N_{reactant}$ is mole rate of reactant, and $LHV_{reactant}$ is the lower heating value of the reactant.

The energy efficiency calculations of both systems are shown in FIG. 4. The efficiency for the conventional co-electrolysis process increases significantly at low current density and rises steadily when the current density exceeds about 0.8 A $cm^{-2}$. The efficiency curve of the combined mode displays the same trend with that of the conventional mode, but it is always above the conventional one. For instance, at 0.4 A $cm^{-2}$, the efficiency of the combined mode (0.64) is 36% higher than the conventional mode (0.47). This demonstrates that the introduction of carbon gasification in the anode side effectively improve the efficiency of the co-electrolysis process.

In thermodynamic terms, the reaction process of the disclosed system is the same as traditional carbon gasification that utilizes steam and $CO_2$ as gasifying agents. However, there are several merits when the process is performed in conjunction with an SOEC as disclosed herein. For instance, the disclosed systems can provide an efficient electricity-to-chemical conversion process, but this system can also be directly used to generate electricity. As such, the disclosed systems can serve in load leveling and energy storage between the electricity and fuel. Moreover, in disclosed systems, the reaction rate and conversion rate of reaction can be easily controlled and managed by controlling the applied current density.

The design of disclosed systems provides for extreme flexibility. For example, a system can be implemented as a distributed syngas generation system under atmospheric pressure. This can provide cost savings as compared to typical carbon gasification systems that operate at high pressure. Disclosed systems can also be implemented in any sized process, e.g., large scale chemical plants or coal-based power plants. Moreover, separation of carbon and gas agent in disclosed systems can produce clean and pure syngas without contaminants such as $H_2S$ and $N_xO_y$, which means that dirty fuels such as coal can be converted to green and clean fuels.

Moreover, compared with the conventional co-electrolysis systems, the energy efficiency of disclosed systems is higher, as discussed above. Also, compared with other $CO_2$ utilization technologies, disclosed systems do not need pure $CO_2$, which can save the cost of purification of $CO_2$. Overall, disclosed systems show great promise for eco-friendly and efficient utilization of coal/biomass and $CO_2$ to store energy and reduce the emission of $CO_2$.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A syngas generation system, comprising:
   a solid oxide electrolysis cell comprising a cathode, an anode, and an electrolyte between the cathode and the anode; and
   a carbon gasification unit in fluid communication with the anode, the gasification unit comprising a gasification chamber that is configured to operate at substantially atmospheric pressure.

2. The syngas generation system of claim 1, further comprising a power supply configured to provide a voltage potential across the cathode and the anode.

3. The syngas generation system of claim 1, further comprising a feed line to the cathode configured to deliver carbon dioxide and water to the cathode.

4. The syngas generation system of claim 3, further comprising a heating system in contact with the feed line.

5. The syngas generation system of claim 1, the cathode comprising a nickel-zirconia cermet.

6. The syngas generation system of claim 1, wherein the electrolyte is an oxygen ion-conducting solid electrolyte.

7. The syngas generation system of claim 1, wherein the anode comprises a carbon monoxide resistant material.

8. The syngas generation system of claim 7, wherein the carbon monoxide resistant anode material includes $Sr_2Fe_{1.5}Mo_{0.5}O_{6-\delta}$, or $La_{0.7}Ca_{0.3}Cr_{0.97}O_3$.

9. The syngas generation system of claim 1, the system comprising an array of solid oxide electrolysis cells.

10. A method for generating syngas comprising:
    electrochemically reducing water and carbon dioxide at a cathode to produce a first syngas product and oxygen ion, the oxygen ion migrating across an electrolyte adjacent to the cathode and thence to an anode;
    reacting a solid carbon with carbon dioxide and water at a gasification unit to produce a second syngas product;
    delivering at least a portion of the second syngas product to the anode such that carbon monoxide and hydrogen gas of the second syngas react with the oxygen ion to produce carbon dioxide and water;
    delivering at least a portion of the carbon dioxide and water produced at the anode to the gasification unit.

11. The method of claim 10, further comprising feeding the water and the carbon dioxide to the cathode as a single feed stream.

12. The method of claim 11, further comprising heating the single feed stream to provide the water to the cathode as steam.

13. The method of claim 12, wherein the single feed stream is heated with energy generated from a renewable energy source or waste heat.

14. The method of claim 12, wherein the single feed stream is provided to the cathode at temperature of from about 773 K to about 1273 K.

15. The method of claim 10, further comprising providing a voltage potential across the cathode and the anode.

16. The method of claim 15, the voltage potential increasing an oxygen ion transport rate across the electrolyte.

17. The method of claim 10, wherein the carbon dioxide and the water are provided to the cathode at a ratio such that the first syngas product includes hydrogen gas and carbon monoxide at a ratio of about 2 to 1.

18. The method of claim 10, wherein the solid carbon is obtained from a carbon source selected from peat, coke, coal, char, petroleum coke, tar sand, oil sand, waste plastics, biomass or carbon produced by pyrolysis of carbonaceous substance.

* * * * *